US012629884B2

(12) United States Patent
Garmshausen et al.

(10) Patent No.: US 12,629,884 B2
(45) **Date of Patent: *May 19, 2026**

(54) METHOD AND APPARATUS FOR PROCESSING AN OPTICALLY REACTIVE MATERIAL

(71) Applicant: xolo GmbH, Berlin (DE)

(72) Inventors: Yves Garmshausen, Berlin (DE); Marcus Reuter, Berlin (DE); Martin Regehly, Berlin (DE); Niklas Koenig, Berlin (DE)

(73) Assignee: XOLO GMBH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,871

(22) Filed: Mar. 30, 2024

(65) Prior Publication Data

US 2024/0246286 A1 Jul. 25, 2024

Related U.S. Application Data

(63) Continuation of application No. 17/755,624, filed as application No. PCT/DE2020/100952 on Nov. 6, 2020, now Pat. No. 11,999,099.

(30) Foreign Application Priority Data

Nov. 6, 2019 (DE) ......................... 102019129868.7

(51) Int. Cl.

| | |
|---|---|
| ***B29C 64/135*** | (2017.01) |
| ***B29C 64/129*** | (2017.01) |
| ***B29C 64/264*** | (2017.01) |
| ***B29C 64/277*** | (2017.01) |
| ***B33Y 10/00*** | (2015.01) |
| ***B33Y 30/00*** | (2015.01) |

(52) U.S. Cl.

CPC .......... *B29C 64/135* (2017.08); *B29C 64/129* (2017.08); *B29C 64/264* (2017.08); *B29C 64/277* (2017.08); *B33Y 10/00* (2014.12); *B33Y 30/00* (2014.12)

(58) Field of Classification Search

CPC ... B29C 64/129; B29C 64/135; B29C 64/264; B29C 64/268; B29C 64/273; B29C 64/277; B29C 64/282; B29C 64/286; B29C 64/291; B29C 71/04

See application file for complete search history.

(56) References Cited

U.S. PATENT DOCUMENTS

| | | | |
|---|---|---|---|
| 4,041,576 A | 8/1977 | Swainson | |
| 2011/0006459 A1 | 1/2011 | Cregger et al. | |
| 2018/0015661 A1 | 1/2018 | Ku et al. | |
| 2018/0015672 A1 | 1/2018 | Shusteff et al. | |
| 2018/0029296 A1 | 2/2018 | Van Esbroeck et al. | |
| 2018/0326666 A1* | 11/2018 | Kelly | B29C 64/241 |
| 2019/0016052 A1 | 1/2019 | Clark | |
| 2019/0160539 A1 | 5/2019 | Lei et al. | |
| 2022/0410473 A1 | 12/2022 | Garmshausen et al. | |

FOREIGN PATENT DOCUMENTS

WO 2019194798 10/2019

OTHER PUBLICATIONS

International Search Report issued in international application No. PCT/ DE2020/100952, mailed Feb. 22, 2021, 17 pp.

International Preliminary Report on Patentability issued in international application No. PCT/DE2020/100952, mailed May 10, 2022, 8 pp.

Office Action issued in German application No. 102019129868.7 dated Jun. 22, 2020, 6 pp.

* cited by examiner

*Primary Examiner* — Philip C Tucker
*Assistant Examiner* — Jimmy R Smith, Jr.
(74) *Attorney, Agent, or Firm* — SNELL & WILMER L.L.P.

(57) ABSTRACT

A method for processing an optically reactive material, particularly for manufacturing or structuring of an object. The method can include optically processing a starting material in a working volume by irradiating light of a first wavelength and light of a second wavelength different from the first wavelength, wherein at least one material property of the starting material is changed by the optical processing. The optical processing can include irradiating a first partial volume of the working volume at least partially filled with the starting material using the light of the first wavelength; irradiating the first partial volume of the working volume using the light of the second wavelength, wherein the light of the second wavelength is projected into the working volume; and irradiating a second partial volume of the working volume at least partially filled with the starting material, which is different from the first partial volume.

16 Claims, 7 Drawing Sheets

METHOD AND APPARATUS FOR PROCESSING AN OPTICALLY REACTIVE MATERIAL

CROSS-REFERENCE TO RELATED APPLICATIONS

This application is a continuation of U.S. application Ser. No. 17/755,624 entitled "Method and Apparatus for Processing an Optically Reactive Material" and filed May 3, 2022, which is a U.S. National Phase Application under 35 U.S.C. § 371 of PCT/DE2020/100952, filed Nov. 6, 2020, which claims priority to German Patent Application No. 10 2019 129 868.7, filed Nov. 6, 2019. The contents of these applications are incorporated by reference herein.

FIELD

The invention relates to a method and a device for processing an optically reactive material.

BACKGROUND

Starting materials can be optically processed, that is to say by means of the irradiation of light of one or more wavelengths onto the starting material, in order to change at least one material property of the starting material thereby. Thus, it is for example known per se to cure a starting material with the aid of such optical processing.

In the document U.S. Pat. No. 4,041,476, a method and a device are described, using which a three-dimensional body can be produced from a starting material, in that light beams of different wavelength are irradiated onto the starting material and overlap in a punctiform manner in the process.

In the document US 2019/001 605 2 A1, a method and a device for an additive method for producing three-dimensional bodies are described. Here, it is provided to arrange a plurality of LCD displays above one another in order to image a three-dimensional image onto a material to be cured with the aid of the LCD displays. The LCD displays are here positioned as layers in a stationary manner in a stacked arrangement. A polymer that can be hardened by UV should be processed in this manner.

A method for producing a printable 3D nanostructure is known from the document US 2019/0160539 A1, comprising: a first light source, which is configured to bring a polymer medium into an excited state by means of a dynamic spatial light modulation element, in order to initiate the polymerization; a second light source, which is configured to selectively load the polymerized medium with inhibition energy, in order to inhibit the polymerization, as a result of which a dead zone is created below a growth zone, which enables continuous 3D polymerization.

In the document US 2019/160539 A1, an additive manufacturing device is disclosed, which has the following: a platform, a dispenser, which is configured to deliver a plurality of successive layers of a feed material onto the platform, a light source arrangement for generating a first light beam and a second light beam, a beam combiner, which is configured to combine the first light and the second light into a common light beam, and a mirror scanner, which is configured to direct the common light beam onto the platform, in order to deliver energy along a scanning path on an outermost layer of the feed material.

The polymerization is a reaction, which is used for producing plastics. In photopolymerization, which is a form of optical processing of a starting material, the reaction is triggered by irradiating light onto the polymerizable starting material. Such polymerizable starting substances or materials are also termed photopolymers. Here, this is a polymer which changes its material properties when it is irradiated with light. The light irradiation effects structural changes, for example the photochemical hardening of the material due to cross-linking. Photopolymerization is for example used during 3D printing, in order to produce three-dimensional shaped bodies from the cured material by means of light irradiation in the polymerizable starting material.

The starting material itself may be transparent for the irradiated light and therefore insensitive. Photoinitiator molecules are admixed, which absorb the light and initiate the curing of the starting material. For processing the starting material in the unchanged (free) volume, addressing a freely chosen point in 3-dimensional space is necessary. One possibility is the use of specific photoinitiators, which are also termed dual colour photoinitiators. These are preferably or exclusively excited by absorption of photons of two different wavelengths. Dual colour photoinitiators can be created in different ways, in a variant, molecules without light irradiation have a base/normal state (A). In this state, the molecule has an absorption band for a wavelength $\lambda_1$ and a lowest possible absorption at a different wavelength $\lambda_2$.

The molecules can then assume a pre-activated or excited intermediate state (B). The excited intermediate state is created by absorption of light of the wavelength Mi from the base state A. The photoinitiator molecules have an absorption band for the wavelength $\lambda_2$. The absorption band for the wavelength $\lambda_1$ disappears. Alternatively, the absorption band for the wavelength $\lambda_1$ is retained. As a result, an undesired, competing transition channel is created for state C. In the absence of light, the photoinitiator molecule returns to the state A. Alternatively, the photoinitiator molecule returns to the state A after excitation with light of a third wavelength $\lambda_3$. This allows a targeted inhibition of the initiator in the state B.

The active state C of the molecules is created by absorption of the wavelength $\lambda_2$ from B. The state C starts a chemical and/or a physical modification of the direct environment of the molecule. A back reaction to B is not provided, but is possible.

SUMMARY

It is the object of the invention to specify a method and a device for processing an optically reactive material, using which a starting material can be optically processed multidimensionally in an efficient manner.

To achieve this, a method and a device for processing an optically reactive material according to independent claims 1 and 15 are created. Embodiments are the subject-matter of dependent sub-claims.

According to one aspect, a method for processing an optically reactive material is created, which comprises the following: providing a starting material, which is optically reactive and fills a working volume; and optically processing the starting material in the working volume by means of irradiation of light of a first wavelength and light of a second wavelength, which is different from the first wavelength, wherein the light of the first wavelength and the light of the second wavelength is provided by a lighting device and at least one material property of the starting material is changed by means of the optical processing. The optical processing comprises the following: irradiating a first partial layer volume of the working volume filled with the starting material using the light of the first wavelength; irradiating the first partial layer volume of the working volume using the light of the second wavelength, wherein the light of the second wavelength is projected into the working volume by means of a projection device capturing only the first partial layer volume wholly or partially; irradiating a second partial layer volume of the working volume filled with the starting material, which is different from the first partial layer volume, using the light of the first wavelength; irradiating the second partial layer volume of the working volume using the light of the second wavelength, wherein the light of the second wavelength is projected into the working volume by means of the projection device capturing only the second partial layer volume wholly or partially; and repeating the preceding steps for layer-by-layer optical processing of the starting material in the working volume until a volume of the starting material to be processed, which captures the working volume wholly or partially, is optically processed.

According to a further aspect, a device is created for processing an optically reactive material, having: a working volume, which is configured to accommodate a starting material, which is optically reactive and fills the working volume; a lighting device, which is configured to provide light of a first wavelength and light of a second wavelength to irradiate onto the working volume having the starting material; and a projection device, which is configured to project the light of the second wavelength during irradiation onto the working volume filled with the starting material into a partial layer volume of the working volume and only capturing the partial layer volume wholly or partially. The lighting device and the projection device are further configured to optically process the starting material in the working volume as follows: irradiating a first partial layer volume of the working volume filled with the starting material using the light of the first wavelength; irradiating the first partial layer volume of the working volume using the light of the second wavelength, wherein the light of the second wavelength is projected into the working volume by means of a projection device capturing only the first partial layer volume wholly or partially; irradiating a second partial layer volume of the working volume filled with the starting material, which is different from the first partial layer volume, using the light of the first wavelength; irradiating the second partial layer volume of the working volume using the light of the second wavelength, wherein the light of the second wavelength is projected into the working volume by means of the projection device capturing only the second partial layer volume wholly or partially; and repeating the preceding steps for layer-by-layer optical processing of the starting material in the working volume until a volume of the starting material to be processed, which captures the working volume wholly or partially, is optically processed.

With the aid of the method and the device, it is made possible to optically process the starting material, which is already introduced in the working volume and fills the same prior to the irradiation of the light of first and second wavelength, in the working volume multidimensionally or spatially in such a manner that by means of the irradiation of the light of first and second wavelength, at least one material property of the starting material is changed, optionally by light of one or more further wavelengths.

Successively, the partial layer volumes of the working volume are irradiated with the first and the second wavelength, in order to thus trigger an optically initiated reaction in the starting material. The partial layer volumes, which are optically processed successively, contain partial volumes of the starting material, which is introduced in the working volume prior to the start of the manufacturing process (optical processing), and are filled by the same. In contrast with known methods, during the optical processing no layer-by-layer application of the starting material and respective subsequent layer by layer optical processing (of the just applied layer) after the layer application takes place.

Depending on which partial layer volume inside the working volume previously filled with the starting material is irradiated with the first wavelength, the projection of the light of the second wavelength with the aid of the projection device takes place into precisely this partial layer volume irradiated instantaneously and currently with the first wavelength. The projection device effects an imaging of the light of the second wavelength into the currently desired partial layer volume. Here, the projection device can image the light of the second wavelength of an at least two-dimensionally shaped image accordingly into the projection plane or the projection volume, which is located in the partial layer volume which is irradiated with the light of the first wavelength. In this manner, a three-dimensional body can for example be produced layer by layer in the starting material.

With the aid of a control device, which is connected to one or more light sources for providing the light of the first wavelength and the light of the second wavelength and to the projection device, it can be determined whether the first or the second partial layer volumes (of the starting material in the working volume) is irradiated and the projection device can be activated as a function thereof to project the light of the second wavelength into the first or the second partial layer volume. Here, data are provided in the control device, which define the current or instantaneous position of the partial layer volume which is irradiated with light of the first wavelength. On this basis, the projection device is controlled in such a manner that the projection created with the aid of the projection device takes place into this currently irradiated partial layer volume in a projection plane or in a projection volume. In this manner, the partial layer volumes of the starting material are processed successively layer by layer. The outer shape of the projection of the projection device can herein be different for different partial layer volumes, particularly depending on a three-dimensional body, which should be produced with the aid of the optical processing in the starting material.

It may be provided, in an embodiment, to detect a current or instantaneous position of the partial layer volume, which is being irradiated with the light of the first wavelength, in the working volume with the aid of a measuring device, which then transmits measurement signals indicating the position to the control device.

The light of the first wavelength and the light of the second wavelength can be irradiated simultaneously together into the first or the second partial layer volume at least for a temporal overlap time period. In this embodiment, the region captured by the partial layer volume and the projection of the projection device is irradiated at least for the temporal overlap period both with light of the first wavelength and with light of the second wavelength.

The first and the second partial layer volume may form adjacent partial layer volumes of the starting material in the working volume.

It may be provided that the first and the second partial layer volumes are formed according to one of the following configurations of partial volumes: overlapping at the edge, abutting at the edge and spaced apart from one another at the edge.

The light of the first wavelength can be irradiated along a first irradiation direction and the light of the second wavelength can be irradiated along a second irradiation direction, which runs transversely to the first irradiation direction, onto the starting material in the working volume. In an embodiment, the first and the second irradiation direction for example assume an angle of approximately 90°. Different angles in the range of approximately 30° to 90° between the optical axes of the irradiation directions may be provided.

The light of the first wavelength and/or the light of the second wavelength can be irradiated as pulsed light. The light pulses of the light of the first and second wavelengths can be irradiated at the same time or at a predetermined temporal interval after one another into the currently processed partial layer volume. The light pulses for the light of the two wavelengths can be provided with the same or different temporal pulse widths. Alternatively, the light of the first wavelength or the light of the second wavelength can be irradiated as continuous light.

The starting material can be processed by means of the optical processing in accordance with at least one processing method from the following group: curing, hardening, gelling and liquefaction. In this or other embodiments, the starting material may be solid, liquid or paste-like.

It may be provided, in an embodiment, that the starting material is caused to light up owing to the optical processing with the light of the first and second wavelength, particularly owing to fluorescence or phosphorescence.

To irradiate the first partial layer volume and to irradiate the second partial layer volume using the light of the first wavelength, a layer-formed irradiation area of a first light source, using which the light of the first wavelength is provided, is displaced relative to the working volume. In this embodiment, the layered irradiation area for the light of the first wavelength is displaced during the optical processing of the starting material relatively thereto, so that the irradiation area runs or sweeps over the working volume so to speak. The relative movement between working volume and the irradiation area can be realized in a range of ways. A displacement of the working volume and/or the first light source may be provided. Alternatively or additionally, working volume and first light source may be fixed relative to one another during the complete processing of the starting material. With the aid of a light deflection device, the irradiation area for the light of the first wavelength is then moved by the first light source over the working volume with the starting material.

It may be provided that the optical processing of the starting material is observed with the aid of one or more light detectors, for example by means of a camera and/or a photodetector. Here, the procedures during the processing (optical processing) can be investigated, in that for example, transmitted light is measured, be it light of excitation of the light section and/or light from the projector. The light section generator and/or the projector can emit further light wavelengths, which are different from the excitation wavelengths and are only used for observing the change of the material property of the starting material, for example the ongoing polymerization.

A polychromatic multi-photon polymerization ("xolography"), which effects the change of the at least one material property of the starting material, can be triggered in the starting material by means of the optical processing. In this exemplary design, the starting material may comprise one or more of the following substances.

| Substance | Structural formula | Proportion of 27.1 g starting material in total (Example) |
|---|---|---|
| Dual colour photoinitiator | 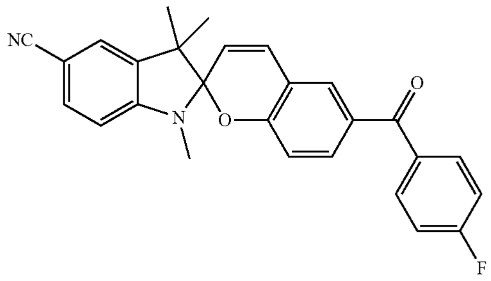 [SMILES: CN1c2ccc(C#N)cc2C(C)(C)C12C=Cc1cc(C(=O)c3ccc(F)cc3)ccc1O2] | 2 mg |
| Pentaerythritol tetraacrylate (monomer) | 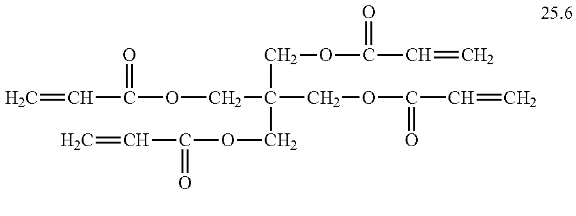 | 25.6 g (21.5 ml) |
| Triethanolamine | 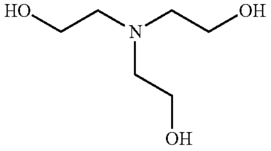 | 0.73 g (1 ml) |
| Ethanol | 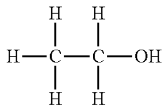 | 0.79 g (1 ml) |

In an exemplary embodiment, the light of the first wavelength can be irradiated initially in the first partial layer volume and then in the second partial layer volume with a substantially homogeneous distribution with respect to at least one of the following light parameters: light intensity and light colour. In this manner, a substantially homogeneous illumination of the respective partial layer volume can be achieved. Alternatively, it may be provided that the light of the first wavelength is irradiated initially in the first partial layer volume and then in the second partial layer volume with a non-homogeneous distribution with respect to at least one of the light parameters, wherein the inhomogeneous distribution in the first partial layer volume may differ from the inhomogeneous distribution in the second partial layer volume. For example, a gradient for the light intensity over the width and/or the height of the partial layer volume can be formed for the light of the first wavelength.

The light of the second wavelength can be projected initially onto the first partial layer volume and then onto the second partial layer volume respectively with a non-homogeneous distribution with respect to at least one of the following light parameters: light intensity and light colour. Whilst the light of the first wavelength can illuminate the respective partial layer volume as spatially homogeneously or uniformly as possible, the light of the second wavelength captures the starting material in the partial layer volume non-homogeneously, rather in accordance with the non-homogeneous light distribution of the light projection (of the light of the second wavelength) directed onto the same, in order thus correspondingly to effect the optical processing of the non-homogeneous light distribution (light parameters). This enables the formation or the production of a spatial outer contour. Optionally, various non-homogeneous light distributions (different projections) can be irradiated per partial layer volume.

During the irradiation of the first partial layer volume and/or during the irradiation of the second partial layer volume with the light of the first wavelength, a partial layer volume with a layer thickness of at most approximately 1 mm can be irradiated or captured. Alternatively, a partial layer volume with a layer thickness of at most 500 μm can be irradiated. In a further alternative embodiment, a partial layer volume with a layer thickness of at most approximately 250 μm can be irradiated. A minimum layer thickness for irradiated partial layer volumes may be approximately 10 μm.

Both a light section of the first wavelength and the projector image of the second wavelength can be created in an embodiment by means of a (single or integrated) projection device and then irradiated onto/into the receptacle. An arrangement of light reflection elements, particularly mirrors, may be provided here, in order to effect a splitting off of the light section from a beam axis of the projection device and the irradiation of the light section into the receptacle transversely to the projection image.

In an embodiment, the receptacle can be moved in order to move the light section through the working volume. The projector image can be imaged by means of a variable focus optical system sharply inside the light section. In a further embodiment, the receptacle remains unmoved and the light section is moved, for example in that a display element of the projection device, for example an LC or a DM display, is divided into a central region, which creates the projector image, and into two regions, which are mounted to the side thereof, which create the light section. To this end, pixels of the display element can be activated by means of activation of the optical transmission and/or reflection of the display element so as to realize a lateral displacement of the light section. Here, a central region of the display element can be irradiated with the first wavelength and outer regions of the display element can be irradiated with the second wavelength.

It may be provided to irradiate light of (at least) one third wavelength onto the material to be processed, wherein the third wavelength is different from the first and the second wavelength. Here, the light of the third wavelength can be irradiated at the same time or temporally offset with respect to the irradiation of the light of the second/first wavelength onto a currently processed partial layer volume. To this end, the projection device or a further projection device can be used in order to limit the light irradiation optionally onto the current partial layer volume. As a result, chemical/physical processes for material treatment initiated or ongoing in the working volume of the material to be processed can (additionally) be influenced, for example during the use of the polychromatic multi-photon polymerization.

In connection with the device for processing the optically reactive material, the embodiments explained previously in connection with the method may accordingly be provided.

DESCRIPTION OF EXEMPLARY EMBODIMENTS

Further exemplary embodiments are explained in more detail in the following with reference to figures of a drawing. In the figures.

Figure 3A:
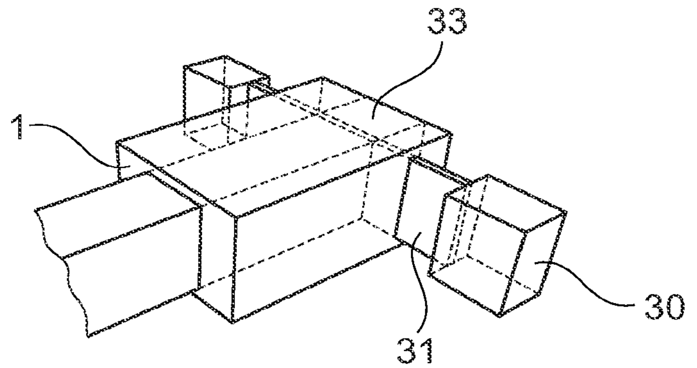
Figure 3B:
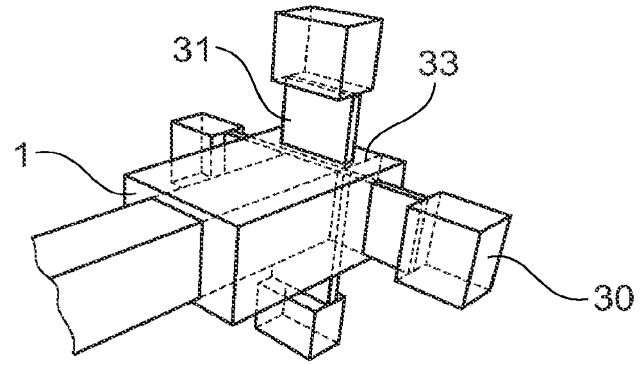
Figure 3C:
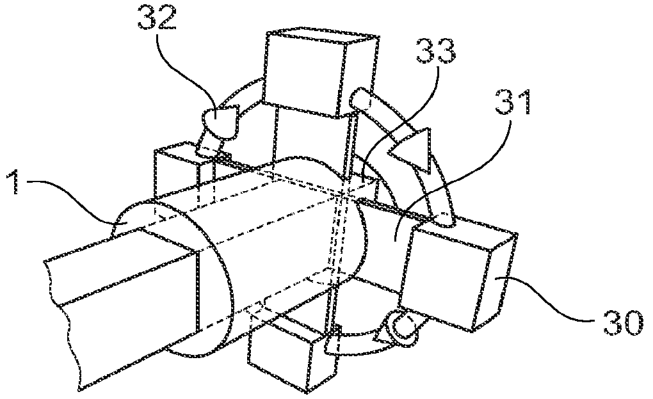
Figure 4:
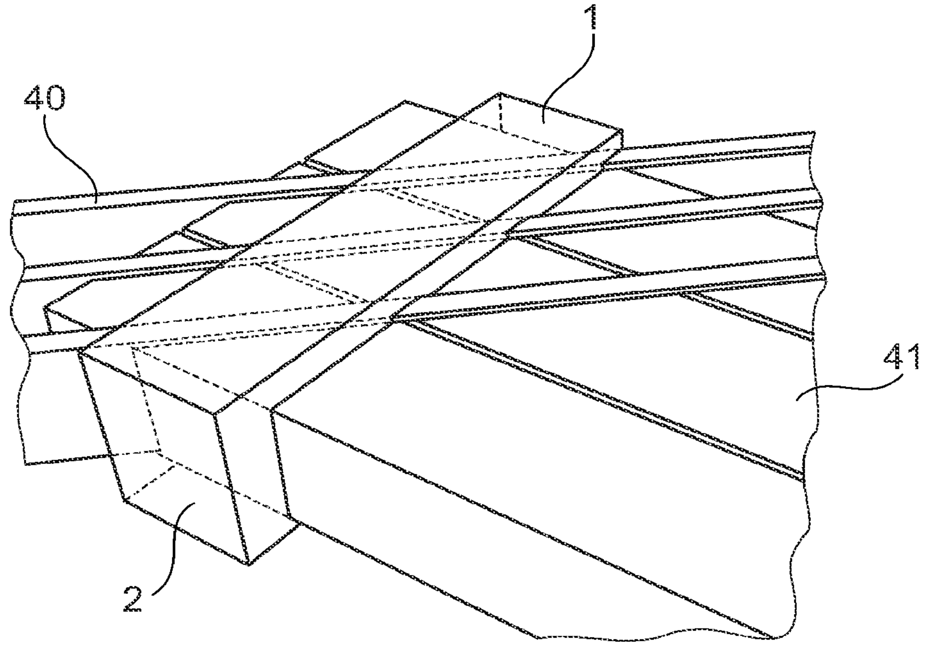
Figure 5:
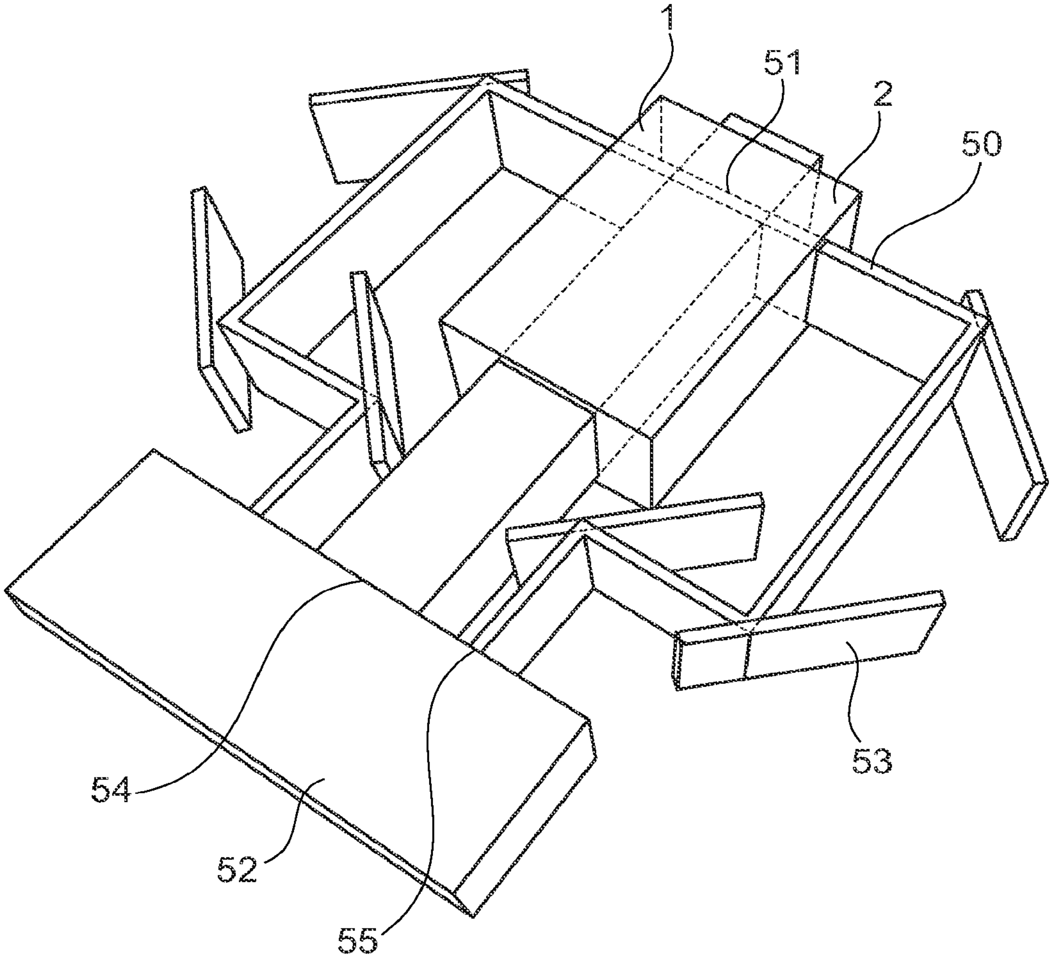
Figure 6:
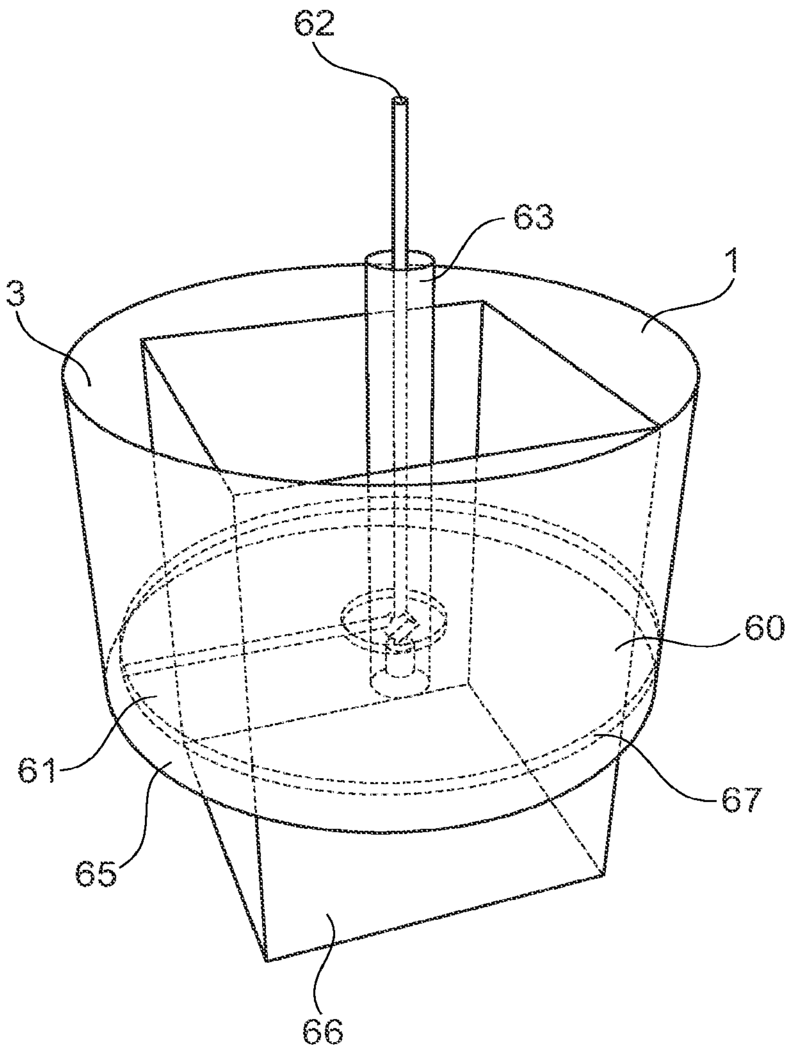
Figure 7:
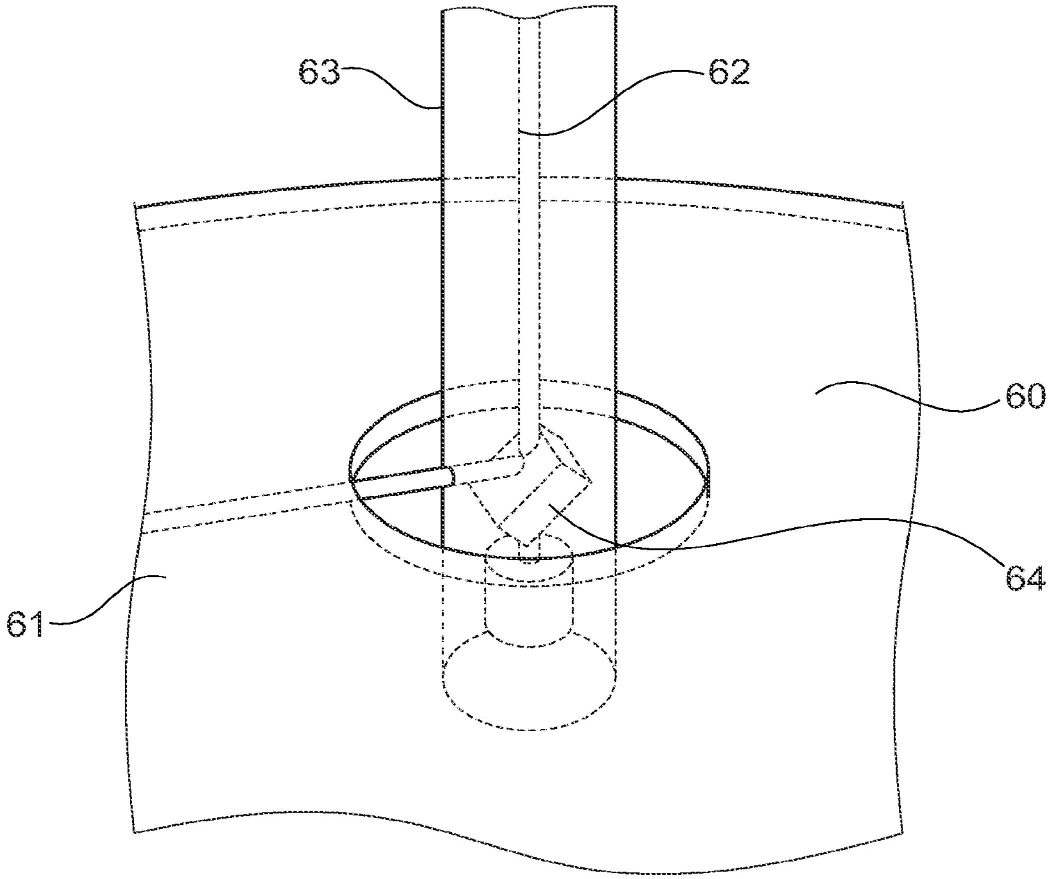

FIGS. 3*a* to 3*c* show schematic illustrations of an arrangement for optical processing of a starting material in a receptacle;

FIG. 4 shows a schematic illustration of a further arrangement for optical processing of a starting material in a receptacle;

FIG. 5 shows a schematic illustration of another arrangement for optical processing of a starting material in a receptacle by means of a projection device;

FIG. 6 shows a schematic illustration of a further arrangement for optical processing of a starting material in a receptacle, and FIG. 7 shows a schematic partial illustration of the arrangement from FIG. 6.

Figure 1:
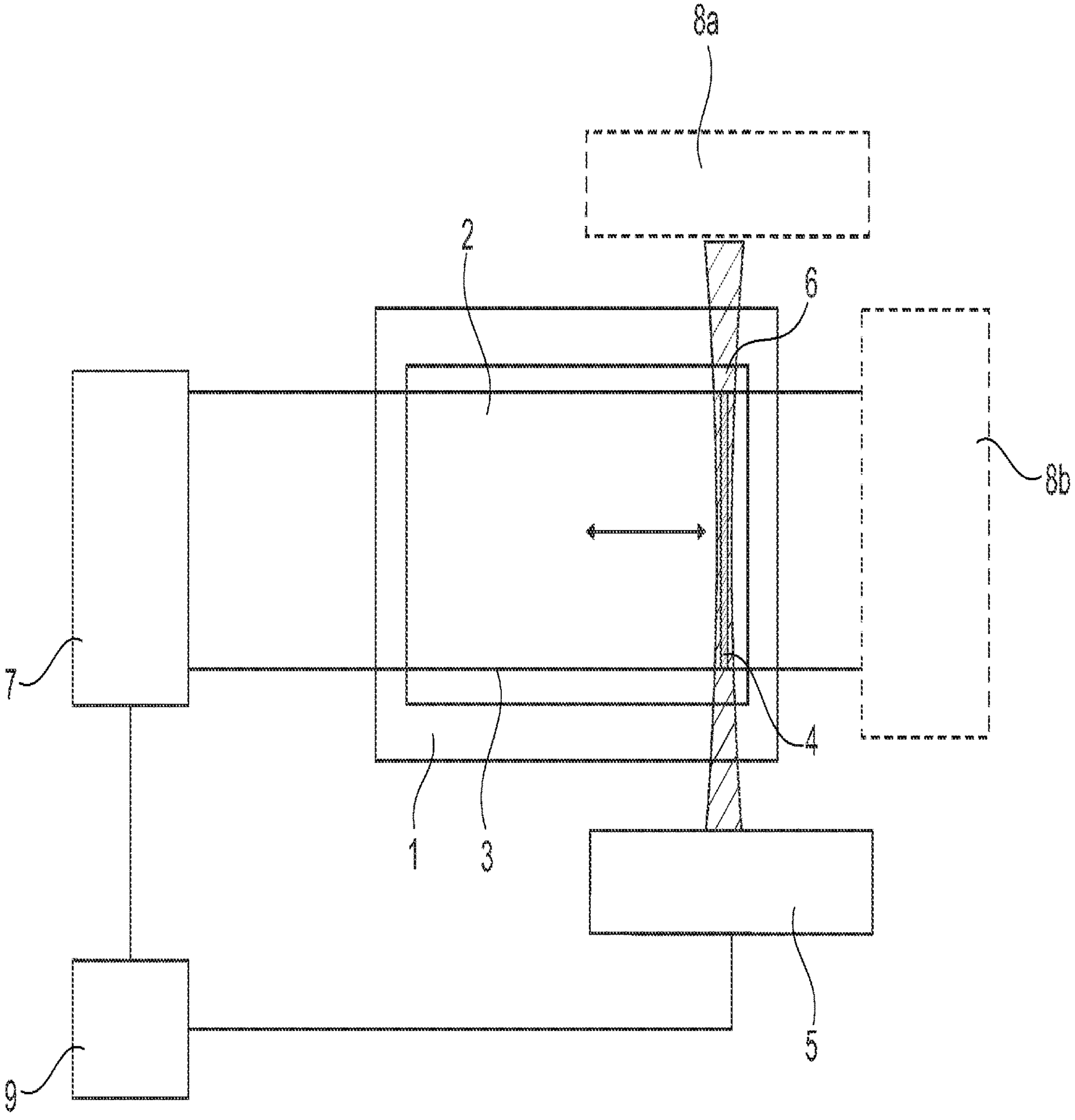
FIG. 1 shows a schematic illustration of a device for processing an optically reactive material from above.
Figure 2:
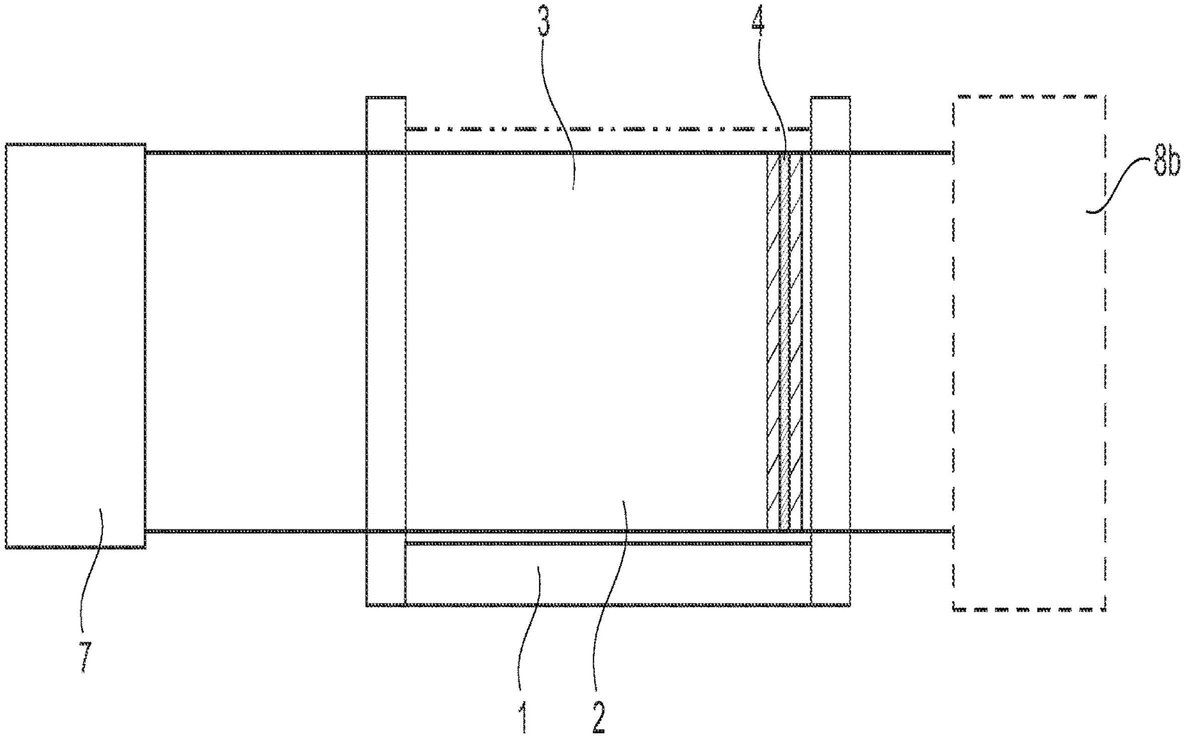
FIG. 2 shows a schematic illustration of the device from FIG. 1 from the side.

FIGS. 1 and 2 show a schematic illustration of an arrangement for a device for optical processing of an optically reactive material from above and from the side. A working volume 2 is provided in a receptacle 1, which working volume is filled at least partially by a starting material 3. The starting material may comprise one or more substances, which may be solid, liquid or paste-like. For processing, the starting material 3 is irradiated with light of a first wavelength and light of a second wavelength, which lights are irradiated in an overlapping manner in the working volume 2 to trigger an optically activated reaction in a partial layer volume 4.

The light of the first wavelength is provided with the aid of a first light source 5, which is realized by way of example in the embodiment shown as a light section generator. During the processing of the starting material 3, an irradiation area 6 for the light of the first wavelength (light section), which is contoured in the embodiment shown, is moved bit by bit over the working volume 2, so that a layer by layer processing of the starting material 3 takes place. Thus, partial layer volumes of the working volume 2 (layered partial volumes of the working volume 2), which had previously been filled with the starting material 3, are irradiated successively, particularly partial layer volumes that do not overlap one another.

The light of the second wavelength is projected (projector or projection image) with the aid of a projector 7 into the partial layer volume currently being irradiated with the light of the first wavelength in dependence on or as a function of the current position of the irradiation area 6 (light section). This means that the projection plane or the projection volume of the projector 7 lies in the partial layer volume which is just being irradiated with the light of the first wavelength. The light of the first wavelength (light section) and the light of the second wavelength (light projection) thereby overlap, spatially or over an area in a projection plane of the projector 7, in a macroscopic partial layer volume of the starting material 3 which as a partial layer volume of the working volume 2 is just being irradiated by means of the light section.

In this manner, in the currently irradiated layered partial volume, at least one material property of the starting material 3 is changed, for example such that the original starting material cures. Here, owing to the coincidence of the light of the two wavelengths, a polymerization is triggered in the starting material 3. In this manner, it is for example made possible to produce a three-dimensionally shaped body layer by layer in the working volume 2. The three-dimensional shaping of the body is here influenced and determined with the aid of the projection of the projector 7 imaged into the respective layer volume.

The device and the method allow an adaptation to different volumes of the starting material 3. Furthermore, an optimization between resolution and speed of processing is allowed.

If ideal dual colour photoinitiators are used in the starting material 3, the excitation of the active state C only takes place in the case of the absorption of both wavelengths $\lambda_1$ and $\lambda_2$ (first and second wavelengths). For non-ideal photoinitiators, a transition from the intermediate state B to the active state C can also take place due to absorption of the wavelength $\lambda_1$. As a consequence, photoinitiators are not only transitioned to the state C at the point of intersection of both wavelengths, but rather also along the entire light beam of the wavelength $\lambda_1$. As there is no way back from the active state C of the photoinitiator to the base state A, a plurality of desired target points accumulates during the processing, a considerable quantity of initiators in the active state C in undesired regions. The device makes it possible in the overlap area of the light beams to create a satisfactory initiator concentration in the active state C for the polymerization of the starting material with simultaneous minimization of the generated concentration of initiator molecules in the active state C along the light beam of the first wavelength $\lambda_1$. Furthermore, the device makes it possible to minimize the accumulation of photoinitiators in the active state C in undesired regions of the volume caused by the light overlay for many successive target points.

If the base state A shows an absorption band for the second wavelength $\lambda_2$, the photoinitiator can be transitioned by light of the wavelength $\lambda_2$ to the intermediate state B and subsequently to the active state C. As a consequence, photoinitiators are not only transitioned to the state C at the overlap area of both wavelengths, but rather also along the entire light beam of the wavelength $\lambda_2$. As there is no way back from the active state C of the photoinitiator to the base state A, a plurality of desired target points accumulates during the processing, a considerable quantity of initiators in the active state C in undesired regions. The device makes it possible in the overlap area of the light beams to create a satisfactory initiator concentration in the active state C for the desired modification of the starting material 3 with simultaneous minimization of the generated concentration of initiator molecules in the active state C along the light beam of the wavelength $\lambda_2$. Furthermore, the device should make it possible to minimize the accumulation of photoinitiators in the active state C in undesired regions of the volume, caused by the light overlay for many successive target points.

The device and the method can be combined with other techniques which limit the undesired curing due to accumulation of photoinitiators in the active state C. In one example, the oxygen concentration in the starting material can be set in order to vary the threshold value from which the material cures.

Further aspects of the device for the optical processing of the starting material 3 are explained in the following.

The starting material 3 can be accommodated in a transparent vessel (receptacle 1) with at least two optically flat entrance windows, which accommodates the starting material 3 with the added dual colour photoinitiator molecules or other optically active molecules and, if appropriate, further additives, such as co-initiators. The light source 5, which is realized as a light generator with imaging optical system, creates a light section of the wavelength $\lambda_1$, which is irradiated through a window of the receptacle 1 into the working volume 2. The projector 7 with a light source of the wavelength $\lambda_2$ creates an image, which is imaged in the receptacle 1 by means of an objective sharply inside the light section.

Due to the refraction of the irradiated light of the second wavelength at the transitions between air and the receptacle 1 and between the receptacle 1 and the starting material 3, a displacement of the focal plane of the projected image (light of the second wavelength) can result compared to the optical imaging without a receptacle 1. In the case of larger working volumes of the receptacle 1, the depth of focus of the focused projector image may not be satisfactory. In this connection, a focus correction may take place continuously during the movement of the light section through the working volume 2.

For applications in the field of 3D printing, the refractive index of the starting material 3 may be similar to the material of the receptacle 1. In this case, only the transition air with refractive index $n_1$ and receptacle 1 with refractive index $n_2$ leads to a displacement of the focal plane by the amount $\Delta s$, given by:

$$\Delta s = d \cdot \left(\frac{n_2}{n_1} - 1\right)$$

With increasing distance d of the position of the light section (light of the first wavelength) from an entrance window of the receptacle 1, where the projector image enters, the focal shift increases according to the above equation. The equation relates to a paraxial optical beam path or larger distances between projector 7 and receptacle 1. Depending on the design, a compensation of the displacement can take place by means of a motorized focus adjustment of the fixedly mounted projector 7 or by means of a motorized positioning of the entire projector 7 relative to the light section position. In the latter example, a uniform, linear relative movement of the projector 7 with respect to the fixed light section results during the uniform movement of the receptacle 1 through the light section (partial layer volume) for processing the whole working volume 2.

Alternatively to the design shown in FIG. 1, the projector image can also enter into the working volume 2 through the base or the lid of the receptacle 1, and the light section can be coupled perpendicularly thereto through one or more of the side windows.

Alternatively, the light section generator 5 can generate the wavelength $\lambda_2$, and the projector 7 generates the wavelength M.

If the transition from the intermediate state B to the initial state A should take place with light of the wavelength $\lambda_3$, the projector 7 generates the wavelengths $\lambda_1$ and $\lambda_3$ or the wavelengths $\lambda_2$ and $\lambda_3$, in each case in a complementary manner to the wavelength of the light section generator.

The receptacle 1 can also be realized as a flow system with automated supply and removal of the starting material 3, in order to process extensive volumes.

One or more light detectors 8*a*, 8*b* (camera or single photodetector; cf. FIGS. 1 and 2) can be used in order to investigate the procedures during processing, in that the transmitted light of excitation of the light section and, if appropriate, the projector 7 is measured. Here, the light section generator 5 and, if appropriate, also the projector 7 emit further light wavelengths, which are different from the excitation wavelengths and are only used for observing the change of the material property of the starting material 3, for example the polymerization.

Furthermore, a measurement of the emitted fluorescence of excited photoinitiators located in the starting material 3 may be provided. For example, the intensity of the whole transmitted or emitted light can be measured by means of a single photodetector and/or the spatially resolved intensity can be recorded by means of a camera. The detectors can selectively measure only certain light wavelengths of the projector 7, the light section generator 5 or the light emitting, excited photoinitiators by means of upstream filters or spectrographs.

A control loop can control the evaluation of the whole or spatially resolved intensities, which influences the intensity of the light section generator, the intensity and image output of the projector, the timing control of the exposure sequence and the displacement of the light section inside the receptacle 1. A control device 9 is provided for that, which, according to FIG. 1, couples to the light source 5 and the projector 7.

A laser light source can be used as light source 5, for example a pulsable single mode diode laser (brand: IBEAM SMART, Toptica Photonics AG, DE) with a wavelength of 375 nm and an output power in continuous wave operation of max. 70 mW, the laser beam diameter is 1.3 mm (@ $1/e^2$). An aspherical POWELL lens (fanning angle 30°, N-BK7, Edmund Optics GmbH, DE) is used for shaping the laser beam into a divergent laser line. A plano-convex cylindrical lens arranged directly behind with a long focal distance (f=300.00 mm, N-BK7, Thorlabs GmbH, DE) and perpendicular orientation to the fanning plane generates a beam waist in an exemplary embodiment with a diameter of approximately d=100 μm at the position of the vessel with the starting material at a distance of 30 cm from this lens. A plano-convex cylindrical lens (f=150.00 mm, N-BK7, Thorlabs GmbH, DE) at a distance of the single focal distance from the POWELL lens collimates the divergent laser line and ensures an approximately parallel beam path along the optical axis, the height of the light section after the collimation is approx. 8.5 cm. A further cylindrical lens of focal distance (f=100.00 mm, N-BK7) is flexibly positioned in front of the vessel, which transitions the beam path into a running light section, which reduces the intensity drop due to the Beer-Lambert Absorption Law inside the vessel. The usable height of the light section in the region of the vessel due to the focusing is approximately 2 cm.

Alternatively to the POWELL lens, a suitably arranged rotating polygon mirror or a galvoscanner can be used to shape a laser beam into a divergent laser line. In principle, it is also possible, instead of the laser, to use a light source which is based on an LED (light emitting diode) or a thermal light source.

A DMD (digital micromirror device from the company Texas Instruments) based projector (brand: ACER X138WH, Acer Group, Taiwan) with a resolution of 1280×720 pixels and 3300 ANSI Lumens can be used as image projector or projector 7. The projection optical system was replaced by a projection objective with 90 mm focal distance (Braun Ultralit 2.4/90, Braun Photo Technik GmbH, Germany), which generates a sharp image inside the vessel. A filter glass (GG475, Schott AG, Germany) that is provided is used for wavelength selection. The control of the projector 7 takes place by means of an HDMI interface.

A large cuvette made from optical glass (internal dimensions: 30 mm×30 mm×30 mm, Hellma, Gmbh & Co. KG, DE) with transparent, flat entrance windows can for example be used as receptacle 1.

FIGS. 3*a* to 3*c* show schematic illustrations for an arrangement with receptacle 1, in which the working volume 2 with the starting material 3 accommodated therein is arranged for optical processing. An arrangement of light sources 30 is provided. The light sources 30 (light generators for creating the light section 31), which are used for irradiating the light of the first wavelength (light section), are arranged adjacent to the receptacle 1, particularly on opposite sides. In the design according to FIG. 3*c*, the arrangement of light sources 30 is arranged in a rotatable manner around the receptacle 1 with the working volume 2, which is shown schematically by means of arrows 32.

Two or more of the light sources 30 can be used, which irradiate from different sides of the receptacle 1 into the working volume 2 and generate the light section 31 by means of overlay of partial beams, that is to say irradiate the respective partial layer volume, into which the projection 33 then takes place.

The light section 31 for the respectively just irradiated partial layer volume results due to the summation of the individual irradiations of the light sources 30 under various angles of incidence. In order to achieve a homogeneous intensity distribution of the light section 31 by means of overlay of the light of two or more light sources, the individual irradiations can, instead of a homogeneous intensity distribution, have a Gaussian or an adapted inhomogeneous intensity distribution.

In a further embodiment according to FIG. 4, two or more light sections 40 (partial layer volumes) are generated, which are incident at an angle into the receptacle 1. One or more projections 41 of projectors (not shown in FIG. 4 for simplification) generate sharp images inside the individual light sections 40 in an inclined focal plane. As a result, processing of a plurality of partial layer volumes can take place simultaneously.

In the embodiments according to FIGS. 3*a* to 3*c*, 4, the receptacle 1 can be moved through the light section 31, 40, or the light section 31, 40 can, in the case of a fixed position of the receptacle 1, be displaced, in order to process the working volume 2 continuously and ultimately completely, in that the partial layer volumes thereof are optically processed successively.

FIG. 5 shows a schematic illustration for a further arrangement with receptacle 1. Both a light section 50 of the first wavelength and a projector image 51 of the second wavelength are created by means of a projection device 52 and then irradiated onto the receptacle 1. An arrangement of light reflection elements 53, particularly mirrors, ensures the splitting off of the light section 50 from a beam axis of the projection device 52 and the irradiation of the light section 50 into the receptacle 1 transversely to the projection image 51.

In an embodiment, the receptacle 1 can be moved in order to move the light beam through the working volume 2. The projector image 51 is imaged by means of a variable focus optical system sharply inside the light section 50. In a further embodiment, the receptacle 1 remains unmoved and the light section 50 is moved, in that a display element of the projection device 52, for example an LCD or a DMD display, is divided into a central region 54, which creates the projector image 51, and into two regions 55, which are mounted to the side thereof, which create the light section 50. To this end, pixels of the display element are activated by means of control of the optical transmission or reflection of the display element so as to realize a lateral displacement of the light section 50. Here, a central region of the display element is irradiated with the first wavelength and outer regions of the display element are irradiated with the second wavelength.

FIG. 6 shows a schematic illustration of a further arrangement for optical processing of the starting material 3 in the receptacle 1. FIG. 7 shows a schematic partial illustration of the arrangement from FIG. 6.

A light section 60 is generated in a horizontal plane 61 by means of a laser beam 62, which enters from above into a dip tube 63, which is optically transparent for the laser beam 62, and is deflected by means of a motor-driven rotating mirror 64 into the receptacle 1 with the starting material 3. The light section 60 of the first wavelength is created by means of rotation. Projector light 66 of the second wavelength is irradiated through a base 65 of the receptacle 1, in order to image a projector image 67 into the horizontal plane 61 of the light section 60 sharply.

The dip tube 63 is closed at the bottom. The motor-driven rotating mirror 64 and the laser beam path 62 are separate from the starting material 3 in the receptacle 1. For processing the starting material 3, the dip tube 63 is moved up or down, as a result of which the horizontal plane of the light section 60 is displaced upwards or downwards.

Further aspects of the method for the optical processing of the starting material 3 are explained in the following.

The local polymerization of the starting material 3, brought about by the light excitation of the photoinitiators, takes place by means of a sequential method, in which a processing takes place layer by layer in the free volume inside the receptacle 1. Initially for this, a breakdown of the desired, three-dimensional object into individual layer images with defined grid spacing is provided (slicing). By overlaying the light section of the light source 5 and the respective sectional image of the projector 7, the excitation of the dual colour photoinitiators from base state A to the active state C takes place, which initiates the polymerization of the starting material 3. After the exposure sequence for the current layer (partial layer volume) has taken place, the light excitation is displaced in a defined manner by moving the receptacle 1 and/or the light section and the projector 7 together and the exposure of an adjacent or any desired other layer (other partial layer volume) is undertaken. The translation of the projection arrangement or the receptacle 1, which can be realized for example by means of suitable stepping motors, may if appropriate be below the waist diameter of the light section, in order to create an increase of the resolution in the movement direction.

There are various options for the temporal course of an exposure sequence for each partial layer volume, which are used depending on the starting material and the properties of the dual colour photoinitiators used:

Variant (1): Simultaneous switching on of both light sources ($\lambda_1$, $\lambda_2$ and if appropriate $\lambda_3$) with defined, if appropriate different intensities for a predetermined exposure time period. After the simultaneous switch off, the translation of the system to the next layer starts.

Variant (2): The first light source 5 (light section generator) and the projector 7 are operated in a temporally pulsed manner. The number, duration and intensity of the pulses and the time offset between the start edges of both pulses can be set freely within the scope of a defined exposure time per partial layer volume. When using a plurality of pulses within the processing of a partial layer volume, a different image of the projector 7 can be assigned to each pulse. After the exposure time, the translation to the next partial layer volume takes place.

Variant (3): The first light source 5 (light section generator) always remains switched on, whilst the projector image is switched over with the translation of the arrangement to the next layer after a defined exposure time.

Variant (4): Physically possible combinations of the variants (1), (2) and (3).

The volumetric method presented here generates the desired spatial object by polymerization of the starting material 3 inside the working volume 2 layer by layer, but it leaves the fundamental structure of the starting material 3 unchanged. This is an advantage compared to methods which can only process the starting material in layers that are separate from one another. Due to the layer-by-layer exposure, the method is in principle faster than the point-by-point polymerization of the starting material.

Owing to the widening of the light section, a larger region of the working volume 2 can be processed simultaneously and therefore faster, which causes a loss of resolution, however.

The creation of the light section by means of the light source 5 causes a coupling between the minimum waist diameter and the divergence of the beam bundle, which leads to a widening of the light beam at the edge of the volume. As a result, either a homogeneous average resolution can be created along the light section or a higher resolution can be generated in the region of the waist with a stronger drop at the edges.

As an earlier processing of layers is enabled in the temporal sequence of layers which are further removed from the projector 7, a possible influencing of the light propagation of the projector image (light of the second wavelength) due to already cured layers is avoided.

Owing to the displacement of the light section, each partial layer volume is only processed once and therefore receives a defined absorbed dose. As a result, the polymerization of undesired areas in the case of the use of non-ideal dual colour photoinitiators is effectively minimized.

If the kinetics of the reactions of the photoinitiator molecules and the starting material 3 triggered by the light irradiation is sufficiently known, the targeted timing control of the light pulses with respect to one another and a suitable choice of the intensities of both wavelengths allows a higher discrimination between desired and undesired polymerization in the working volume 2. As a result, artefacts and a degradation of the resolution can be minimized for non-ideal dual colour photoinitiators.

The features disclosed in the above description, the claims, and the drawing may be of significance both individually and in any desired combination for the implementation of the different embodiments.

What is claimed is:

1. A method for processing an optically reactive material—for manufacturing or structuring of an object, the method comprising:

optically processing a starting material in a working volume by irradiating light of a first wavelength and light of a second wavelength different from the first wavelength, wherein at least one material property of the starting material is changed by the optical processing, the optical processing comprising:

irradiating a first partial volume of the working volume at least partially filled with the starting material using the light of the first wavelength;

irradiating the first partial volume of the working volume using the light of the second wavelength, wherein the light of the second wavelength is projected into the working volume;

irradiating a second partial volume of the working volume at least partially filled with the starting material, which is different from the first partial volume, using the light of the first wavelength;

irradiating the second partial volume of the working volume using the light of the second wavelength, wherein the light of the second wavelength is projected into the working volume; and repeating the preceding steps for layer-by-layer optical processing of the starting material in the working volume until a volume of the starting material to be processed, which captures the working volume at least partially, is optically processed;

wherein the light of the first wavelength is irradiated into the working volume via four light sections, which irradiate into the working volume from different sides;

wherein the light of the first wavelength enters the working volume from four sides to thereby create a light plane within the working volume, wherein the light of the first wavelength enters the working volume from at least a first side and at least a second side opposite from the first side and from at least a third side and at least a fourth side opposite from the third side to thereby create the light plane within the working volume.

2. The method of claim 1, further comprising:

determining if the first or the second partial volume is irradiated with the first wavelength; and controlling a projector for projecting the light of the second wavelength in the working volume in dependence therefrom to project the light of the second wavelength into the first and/or second partial volume.

3. The method of claim 2, further comprising:

determining, if the first or the second partial volume is irradiated with the first wavelength; and controlling the projector for projecting the light of the second wavelength in the working volume in dependence therefrom to project the light of the second wavelength into the first and/or second partial volume with a specific intensity distribution.

4. The method of claim 3, wherein the light of the first and the second wavelength are irradiated simultaneously at least for an overlapping period into the first and/or the second partial volume.

5. The method of claim 1, wherein the first and second partial volume form adjacent partial volumes of the starting material.

6. The method of claim 5, wherein the first and second partial volume form adjacent partial volumes of the starting material, wherein the first and second partial volumes are formed according to one of the following configurations of partial volumes: overlapping at an edge, abutting at the edge and spaced apart from one another at the edge.

7. The method of claim 1, wherein the light of the first wavelength is irradiated into the working volume via multiple light generators to create a generated light section, which irradiate into the working volume from different sides into the working volume, wherein the generated light section is generated by overlapping partial beams.

8. The method of claim 1, wherein the light of the first wavelength is irradiated into the working volume via four light generators to create a generated light section, which irradiate into the working volume from different sides into the working volume, wherein the generated light section is generated by overlapping partial beams.

9. The method of claim 8, wherein the four light generators are arranged in pairs at opposing sides of the working volume.

10. The method of claim 1, wherein, for creating a generated light section, light of the first wavelength is irradiated into the working volume in a rotational motion.

11. The method of claim 1, wherein the optical processing of the starting material is observed with a light detector.

12. The method of claim 1, wherein a polychromatic multiphoton polymerization, which effects the change of the at least one material property of the starting material, is triggered by the optical processing in the starting material.

13. The method of claim 1, wherein the light of the first wavelength is irradiated initially in the first partial volume and then in the second partial volume with a substantially homogeneous or inhomogeneous distribution with respect to at least one of light intensity and light color.

14. A method for processing an optically reactive material for manufacturing or structuring of an object, the method comprising:

optically processing a starting material in a working volume by irradiating light of a first wavelength and light of a second wavelength different from the first wavelength, wherein at least one material property of the starting material is changed by the optical processing, the optical processing comprising:

irradiating a first partial volume of the working volume at least partially filled with the starting material using the light of the first wavelength;

irradiating the first partial volume of the working volume using the light of the second wavelength, wherein the light of the second wavelength is projected into the working volume;

irradiating a second partial volume of the working volume at least partially filled with the starting material, which is different from the first partial volume, using the light of the first wavelength;

irradiating the second partial volume of the working volume using the light of the second wavelength, wherein the light of the second wavelength is projected into the working volume; and repeating the preceding steps for layer-by-layer optical processing of the starting material in the working volume until a volume of the starting material to be processed, which captures the working volume at least partially, is optically processed, wherein layers in a temporal sequence of layers which are farther arranged from a light source of the light of the second wavelength are processed earlier.

15. A method for processing an optically reactive material for manufacturing or structuring of an object, the method comprising:

optically processing a starting material in a working volume by irradiating light of a first wavelength and light of a second wavelength different from the first wavelength, wherein at least one material property of the starting material is changed by the optical processing, the optical processing comprising:

irradiating a first partial volume of the working volume at least partially filled with the starting material using the light of the first wavelength;

irradiating the first partial volume of the working volume using the light of the second wavelength, wherein the light of the second wavelength is projected into the working volume;

irradiating a second partial volume of the working volume at least partially filled with the starting material, which is different from the first partial volume, using the light of the first wavelength;

irradiating the second partial volume of the working volume using the light of the second wavelength, wherein the light of the second wavelength is projected into the working volume; and repeating the preceding steps for layer-by-layer optical processing of the starting material in the working volume until a volume of the starting material to be processed, which captures the working volume at least partially, is optically processed, wherein the light of at least one of the first wavelength and the second wavelength is irradiated as pulsed light.

16. A method for processing an optically reactive material for manufacturing or structuring of an object, the method comprising:

optically processing a starting material in a working volume by irradiating light of a first wavelength and light of a second wavelength different from the first wavelength, wherein at least one material property of the starting material is changed by the optical processing, the optical processing comprising:

irradiating a first partial volume of the working volume at least partially filled with the starting material using the light of the first wavelength;

irradiating the first partial volume of the working volume using the light of the second wavelength, wherein the light of the second wavelength is projected into the working volume;

irradiating a second partial volume of the working volume at least partially filled with the starting material, which is different from the first partial volume, using the light of the first wavelength;

irradiating the second partial volume of the working volume using the light of the second wavelength, wherein the light of the second wavelength is projected into the working volume; and repeating the preceding steps for layer-by-layer optical processing of the starting material in the working volume until a volume of the starting material to be processed, which captures the working volume at least partially, is optically processed, wherein the light of at least one of the first wavelength and the second wavelength has a non-homogeneous distribution with respect to at least one of light intensity and light color.

* * * * *